July 21, 1936.   S. M. FAIRCHILD   2,048,439
PHOTOGRAPHIC APPARATUS
Filed April 17, 1935   4 Sheets-Sheet 1

INVENTOR
Sherman M. Fairchild
BY
ATTORNEYS

July 21, 1936.  S. M. FAIRCHILD  2,048,439
PHOTOGRAPHIC APPARATUS
Filed April 17, 1935  4 Sheets-Sheet 2

INVENTOR
Sherman M. Fairchild
BY
Hoguet, Neary & Campbell
ATTORNEYS

July 21, 1936.  S. M. FAIRCHILD  2,048,439

PHOTOGRAPHIC APPARATUS

Filed April 17, 1935  4 Sheets-Sheet 3

INVENTOR
Sherman M. Fairchild
BY
Hoguet, Neary & Campbell
ATTORNEYS

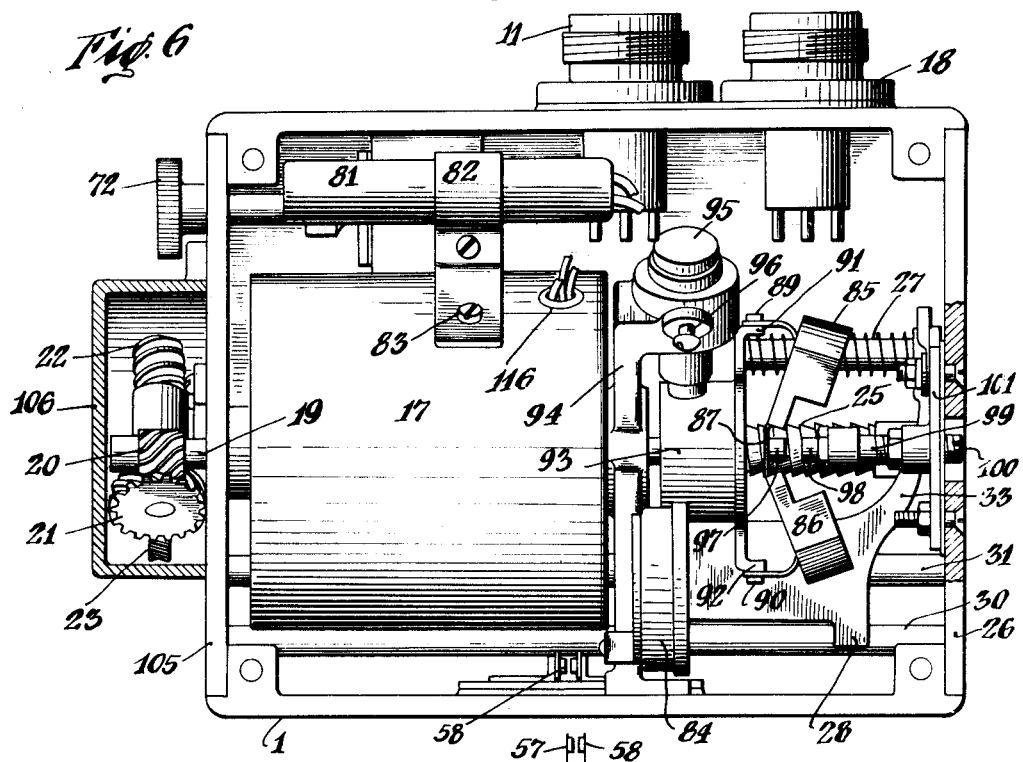
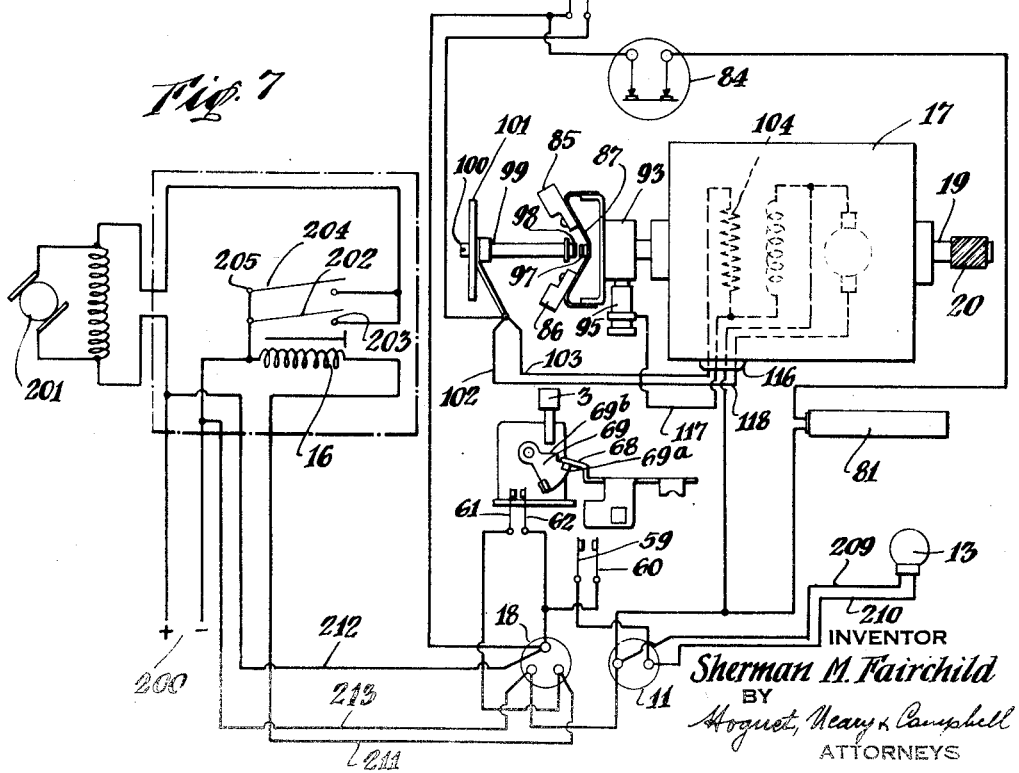

Patented July 21, 1936

2,048,439

UNITED STATES PATENT OFFICE 2,048,439

PHOTOGRAPHIC APPARATUS

Sherman M. Fairchild, New York, N. Y.

Application April 17, 1935, Serial No. 16,785

2 Claims. (Cl. 200—33)

This invention relates in general to cameras and their accessories, particularly those cameras adapted to be operated by power such as used in military and aerial mapping operations.

The invention is more particularly concerned with the provision of an improvement in a remote electrical control for initiating and controlling the photographic exposures of a camera.

It is common practice to operate cameras by means of electric control arranged both remote and adjacent the camera. Such remote control devices, however, have in the majority of instances comprised cumbersome and intricate devices without any thought of a unitary arrangement.

This invention is primarily concerned with but in no wise limited to the control accessory for use in connection with aerial cameras for map making purposes and it is especially adaptable for use on heavier-than-aircraft as well as lighter-than-aircraft. The limitations as to space, weight and accessibility in aircraft have been well recognized and it is therefore one of the objects of this invention to provide a self-contained, light, portable and interchangeable, easily accessible unit for controlling the photographic exposures of the camera.

Another object of the invention is to provide such a unit that will be capable of initiating and controlling the photographic exposures and of predetermining a number of such exposures and the interval between the same. In this connection it is proposed to provide a simple, hand adjustment device for adjusting the operating parts of the unit so as to predetermine the interval between the exposures and to also take a single exposure any time after the control device and camera are at rest.

A further object is to provide a counter device to become a part of the control unit and to become so interrelated with the other working parts of the unit that it will be operated to give an accurate indication of the number of the pictures taken whether instigated by the control for taking a series of pictures or the control for taking a single picture.

Another object is to provide a signal device for warning either the photographer or pilot, or both, at a predetermined interval prior to the tripping of the shutter for each exposure of the series.

A still further object is to provide such a control unit having simple fool-proof operating parts and to reduce to a minimum such operating parts and to substantially eliminate the friction therebetween.

A further object is to provide a simple governor for controlling the speed of the electrical drive for the unit.

As is well known, the temperature range to which instruments such as cameras and their accessories are subjected in aerial flight is appreciably large. As a result it is difficult, if not impossible, to provide a working apparatus of moving parts, necessitating lubrication, for operating uniformly through a wide range of temperature changes. This is due to the relative expansion and contraction of the metals of the corresponding parts and also due to the variance in viscosity of the lubricating material at different temperatures. In order to avoid such difficulties it is an object of this invention to provide a suitable heater controlled by the electrical system of the unit, the heater to be installed and become a part of the unit. It is accordingly proposed to so arrange and construct the heater that it will become operative to a predetermined degree automatically with the decrease in temperature to a certain point and continue to be a source of heat until the temperature rises above said predetermined degree. In this manner there is eliminated the undue congealing of the lubrication material as well as the element of undue relative expansion and contraction between the relative moving parts.

With the foregoing and other objects in view, the invention consists in the combination of parts and in the details of construction hereinafter set forth in the following specification and appended claims, certain embodiments thereof being illustrated in the accompanying drawings, in which:

Figure 6 is a view in side elevation of the unit with the side plate removed and also showing the driving means by means of a section through its casing;

Figure 7 is a diagrammatical showing of the electrical circuit for the control unit and camera.

Figure 1:
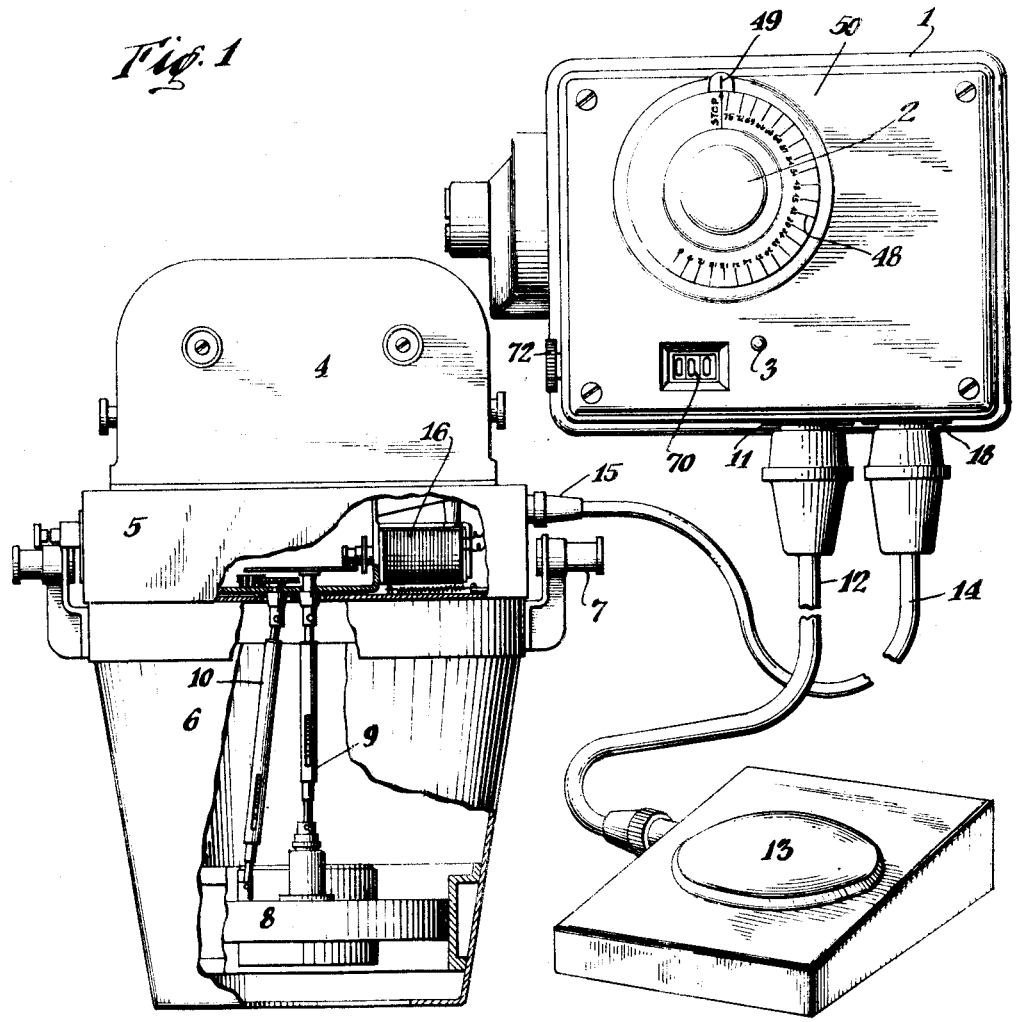
Figure 1 is a view in elevation of the camera partly in section, the warning signal in perspective and the control unit in top plan.

Referring more particularly to the drawings, the control unit or intervalometer is shown as comprising a casing 1 with a hand knob 2 for adjusting the control unit for predetermining the interval between photographic exposures and a hand plunger 3 for taking a single photographic exposure at any time while the control unit and camera mechanism are at rest. The camera may be of the general construction, as shown in Figure 1, to comprise a magazine unit 4, a body 5 and a cone 6. The camera may be suspended by means of a suitable mount generally indicated at 7. The camera may be provided with a between-the-lens shutter of the usual type and generally indicated at 8 with operating rods, such as 9, 10, for respectively setting and tripping the shutter. From the outlet 11 there may extend a cable 12 with lead wires 209 and 210 to a signal light 13 for warning the photographer or pilot, or both, at a predetermined interval prior to the taking of each picture automatically of a series, in accordance with the principle outlined in the U. S. patent to Lewis McSpaden for improvements in Warning signals, Number 1,775,731, patented September 16, 1930. From the outlet 18 there may be a cable 14 extending into the camera at an entrance 15 carrying lead wires 212 and 213 leading to a battery 200 and wires 212 and 211 to a solenoid 16, with a suitably arranged retractable core 16' for tripping the shutter in a manner such as, for instance, disclosed in my patent for Driving and controlling mechanism for automatic cameras, No. 1,817,182, patented August 4, 1931.

The camera operations are in accordance with previously referred to patent. As shown in Figure 7 the source of energy for electrically operating the camera and control unit is shown as a battery 200. This battery is in circuit with a suitable camera operating motor 201 for film changing and shutter setting operations. The element 204 pivoted at 205 represents a member suitably actuated by the closing of switch 61, 62, to complete the circuit of the battery 200 across the solenoid 16 and trip the shutter, by either the finger control member 3 or the member 68 operating against the pivoted member 69 to force the contact 62 against the contact 61. The closing of the switch 202, 203 also brings about a closing of the motor circuit.

The unit is provided with a motor 17 which is in circuit with an inlet 18 connected to a suitable source of electrical power such as battery 200 for energizing the motor. The motor shaft is shown at 19 and carries a worm 20 meshing with a worm wheel 21, which latter carries a worm 22 for driving the gear 23 carried by and rotating shaft 24. This shaft 24 carries throughout a portion of its length an enlarged screw-threaded sleeve 25, which is rigidly secured to the shaft. Parallel to the shaft 24 and extending from the two end plates 26 and 105 of the casing is a square bar 27 upon which is slidably mounted a carriage 28. In order to substantially eliminate friction between the carriage and the bar, the carriage is provided with four roller bearings 29, which straddle the bar and which are so constructed and disposed with relation to the bar that the necessity for lubrication is avoided. Also, parallel with the bar 27 and the shaft 24 is a bar 31 upon which a rack assembly including a toothed rack 32 is slidably mounted, the rack assembly having a forked extension 178, which slidably engages bar 30. The rack assembly also includes an angular extension 33 which terminates in a forked member 34 for loose sliding engagement with the bar 27. In the position shown in Figure 2 it will be seen that by anchoring the rack, the forked member 34 constitutes a means for limiting the movement of the carriage 28 in a direction from left to right. The carriage 28 is provided with an extension 35 which has a downwardly bent portion at 36 adapted to engage the screw-threaded sleeve 25 on the shaft 24. Thus a rotation of the motor shaft in a clockwise direction through the medium of worms 21 and 22 imparts a clockwise rotation of gear 23 and consequently the same direction of rotation to shaft 24. As the shaft 24 rotates in a clockwise direction the threaded sleeve 25 being turned in the same direction will by reason of the engagement of the downwardly bent portion 36 of the carriage 28 with the threads of the sleeve 25 carry the carriage from right to left as used in Figure 2.

The rack assembly also carries a bar 37 extending between the flanges 38, 39 for supporting a plate 40 which is notched at 42 for reasons about to be explained. The plate 40 is provided with two flanges 43 and 44 which abut against the flanges 38 and 39 to limit the rotation of the plate 40 in a forwardly direction. The plate is urged into such a position by means of a coil spring 45 wrapped about the bar 37 and connected to the flange 38 and to the plate 40.

As previously set forth it is the purpose of the unit to provide a means whereby the interval between the photographic exposures of a series may be predetermined. According to the present embodiment of the invention this may be done by means of the manipulation of a single hand control generally indicated at 2.

Figure 3:
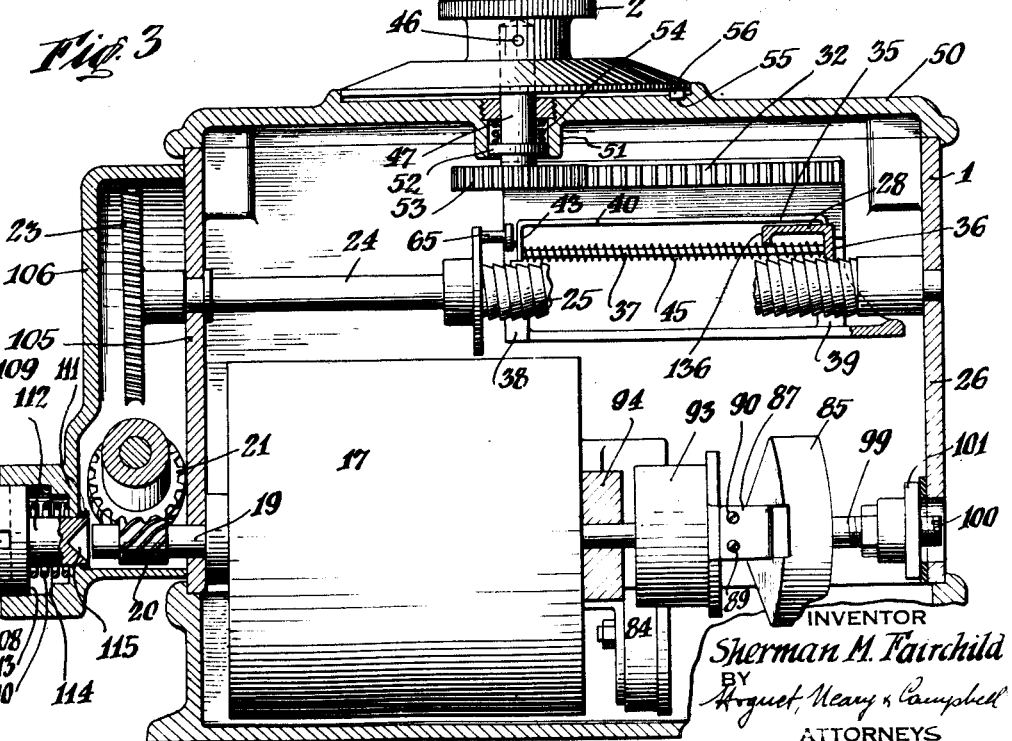
Figure 3 is a view in side elevation of the control unit partly in section with one of the side plates removed.
Figure 4:
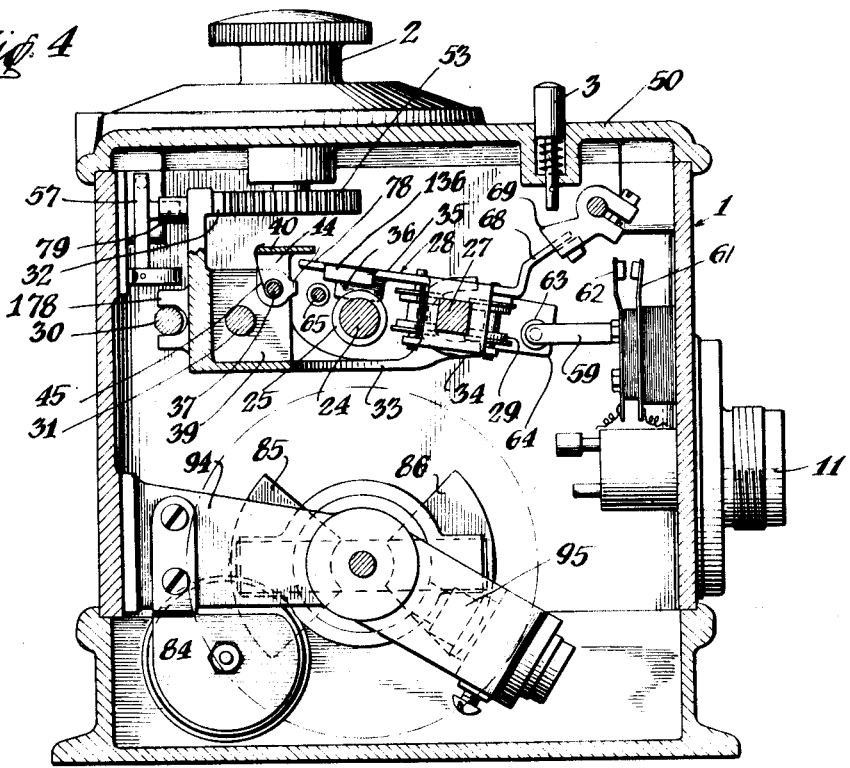
Figure 4 is a view in end elevation of the device with an end view plate and the heater removed.
Figure 5:
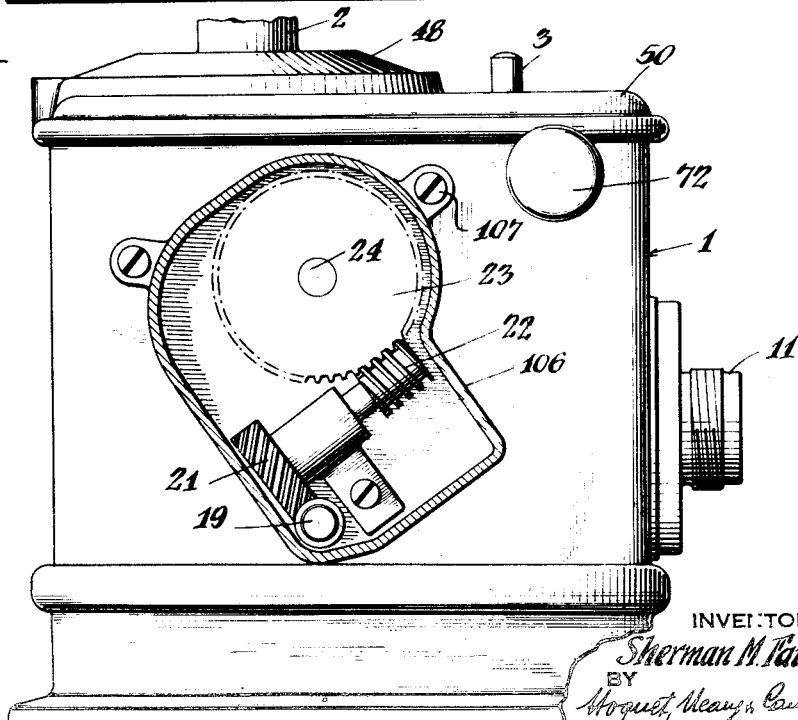
Figure 5 is an end taken from the same end as Figure 4 with the end plate on but with the outer plate of the driving means removed.

Referring to Figures 3 and 4, this hand control may consist of a hand knob 2 secured at 46 to a shaft 47. The hand knob may also carry a calibrated scale 48 for passing by a stationary point 49 on the top plate 50 of the casing for indication purposes. The top plate is formed with a circular flange 51 for receiving an enlarged portion 52 of the shaft 47. The shaft 47 carries gear 53 between which and the top plate is arranged a compression spring 54 which normally forces the hand knob and circular disc against the top plate 50. In doing so it brings one of a series of recesses 55 into a position to engage a pin 56 carried by the top plate to lock the same in any one of its various adjusted positions.

It is therefore necessary, when adjusting the hand knob for different desired predetermined intervals between photographic exposures, to pull outwardly on the hand knob and overcome the resistance of the spring 54 to release the dial from its locked adjusted position before the knob can be turned into either direction for a different desired setting. The scale is shown in Figure 1 as comprising numbers 6, 9, 12, etc., up to 75. This calibration may represent the number of seconds as the desired lapse of time between exposures. There is also a calibration marked "Stop", which setting results in the breaking of the electric circuit so as to bring the control unit and the camera to rest.

As the hand knob 2 is turned clockwise, a rotation is imparted to the gear 53 which meshes with the rack 32 to move the same from left to right.

Figure 2:
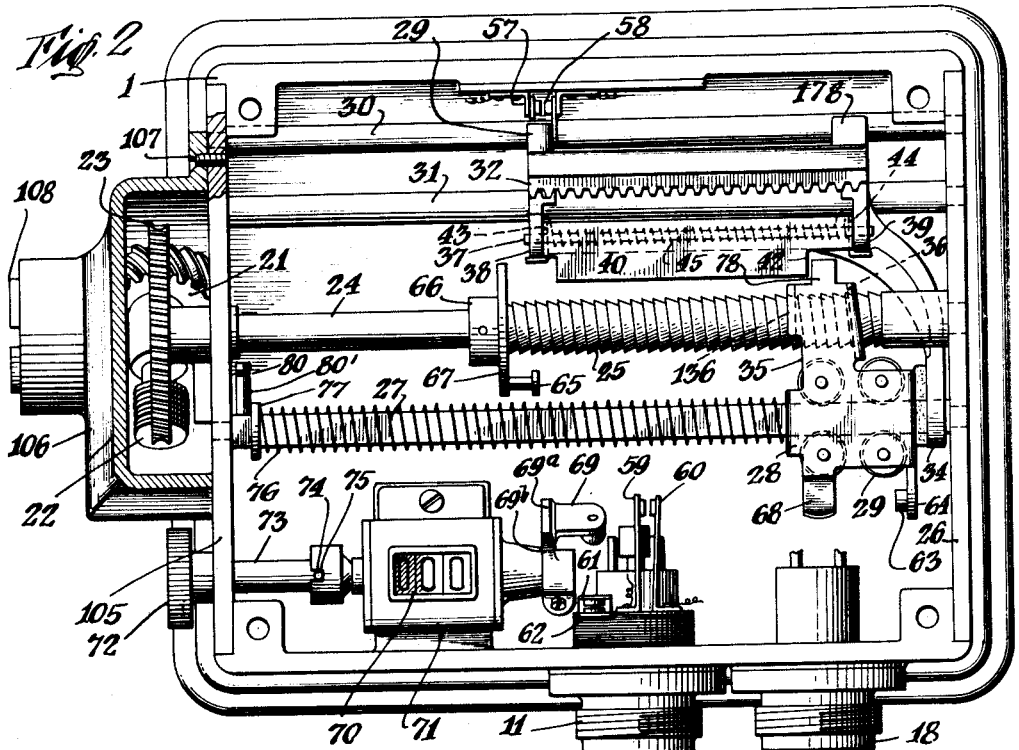
Figure 2 is a top plan view of the unit with the top plate removed.

Figure 2 shows the position that the rack and pinion assume when the dial has been turned to the "Stop" position. This results in the engagement of lug 79 of the rack with spring contact 58, which latter is forced to the right and a consequent breaking of the contact between contacts 57 and 58, so as to open the electrical circuit of the motor 17 and bring the unit and consequently the camera mechanism to rest. A reverse rotation of the hand knob in a counter-clockwise direction would obviously move the rack from right to left and as this is done the forked member 34 is consequently moved from right to left on the bar 27 which, as explained before, limits the movement of the carriage 28 in a direction from left to right. Inasmuch as the movement of the carriage in a direction from right to left is thus limited, by means about to be described, it will be seen that the complete movement from right to left of the carriage between its limiting stops will be lessened in duration and the time involved will correspondingly be decreased by such a setting of the knob. This results in a correspondingly decreased interval between the photographic exposures by means of apparatus about to be described.

The electrical outlet for the illumination of the warning signal and for bringing the solenoid of the camera into operation is shown at 11 and 18. The switch contact for completing the circuit for illuminating the signal light is shown as comprising spring devices 59 and 60, while the switch device for energizing the solenoid 16 for the operation of the shutter is shown as comprising spring contacts 61 and 62. Both of these pairs of spring contacts are normally disengaged from each other so as to leave the circuits incomplete. As the carriage is moved from right to left, as viewed in Figure 2, by reason of the rotation of the motor shaft and the consequent clockwise rotation of the threaded sleeve 25, the time consumed in the movement of this carriage up to a predetermined point represents that time involved in the setting of the shutter by well known means. As the carriage approaches the limit of its movement, the first thing that occurs is the engagement of a member 63 carried by a flange 64 of the carriage with the spring contact 60 so as to force it into engagement with contact 59. This completes the signal light circuit, so as to illuminate the signal light 13 and give a warning to the photographer or pilot, or both, of the fact that after a very short and predetermined expiration of time the shutter will be automatically tripped. Inasmuch as these spring contacts are flexible, they allow of a certain further movement of the carriage in the same direction until the flange 68 of the carriage starts to ride up the bevelled face 69ª of a pivoted pawl 69. This starts to pivot the pawl, after which the flange 136 rides onto a pin 65 carried by the stop limit sleeve 66 and plate 67 rigid with the threaded portion of the sleeve 25, at which time the carriage 28 and bar 27 are forced by pin 65 to pivot away from and out of engagement with threaded sleeve 25 against the action of a suitable tension spring 80 secured at one end to a stationary part of the frame and at the other end to a pin 80' of the bar 27. As a result of this rotation of the carriage, the flange 68 of the carriage forces the pivoted pawl 69, against the resistance of a suitable spring, downwardly about its pivot. This movement of the pawl brings the latter into contact with the spring contact 62 so as to force it against the spring contact 61 to complete the shutter tripping circuit. Simultaneously, as this occurs, the pawl 69 being fast to the counter shaft rotates the same one notch so as to change the indication on the dial 70 of the counter 71. The pawl 69 is provided with an arm 69ᵇ for engagement by the hand plunger 3 for single exposure operation by hand. This counter, by the way, may be set manually by means of the usual hand knob 72 mounted on the shaft 73 with a pin and slot connection shown at 74 and 75.

As the carriage 28 and bar 27 are rotated to bring about an operation of the counter and a completion of the shutter tripping circuit, the arm 78 rotates the plate upwardly, or counter-clockwise as viewed in Figure 4, against the action of the return spring 45. The carriage, as it again is inclined to return to its normal position approaches the threaded portion 25, the flange 36 is prevented from engagement with the teeth threads 25 by reason of the interference of the plate 40 upon which the arm 78 rests during its return to the position shown in Fig. 2. The compression spring 76 which extends between the collar 77 and one side of the carriage being compressed by reason of the movement of the carriage from right to left then expends its energy in returning the carriage to the right as the extremity 78 of the carriage slides along the top surface of the plate 40 until it drops into the notch 42 at the right end of the plate 40. This again brings the carriage into abutment with the forked member 34 and also brings the flange 36 into engagement with the threads 25 for another operation identical with that just described.

As previously stated, in order to eliminate the difficulty arising from extremely low temperatures, such as the congealing of the lubrication material, there has been provided a heating element 81 which may be held adjacent to the motor casing by means of a suitable bracket 82 which is directly secured to the casing of the motor at 83. This heater unit is preferably an electrically operated device and is in circuit with a thermostatic element 84. The thermostatic element likewise may be one of any approved design, it having been set for operation of the electrical heating unit automatically at a certain temperature condition below that desired and for automatically discontinuing the operation of the electrical heating unit when the temperature condition returns to a predetermined desired degree.

The heater unit and the thermostatic element may obviously take other forms and may be placed in different relationship in the unit but it has been found preferable to locate it as particularly shown in Figure 6 adjacent the motor because the necessity for lubrication within the motor is usually greater than that throughout the remaining parts of the unit. The particular arrangement also provides for a neat and compact arrangement for assembling and disassembling purposes.

The unit is also provided with a governor device for regulating the speed of the motor. This governor consists of a pair of segment weights 85 and 86 carried by a leaf spring 87. This leaf spring is secured at 89 and 90 to flanges 91 and 92 of the motor armature 93. The brush 95 for the armature is carried by the casting 94 and is adjustable toward and away from the armature by means of the screw 96. The spring is bent inwardly to the right as viewed in Figure 6. The spring 87 carries a contact device 97 which is normally spaced from a contact device 98 carried by a bar 99 which is adjustable toward and away from the contact 97 by means of the adjustment screw 100.

To the plate 101 there are secured lead wires 102 and 103 which are in circuit with a resistance element 104. As long as the shunt wound motor 17 continues to operate at a normal speed, the spring 87 maintains the revolving contact 97 spaced from the contact 98. However, when the speed of the motor rises above a predetermined degree, the centrifugal force set up in the weights 85 and 86 overcomes the resistance of the spring 87 and flexes the spring in such a manner as to force the contact 97 outwardly toward the left to engage the contact 98. The result of this engagement is to short out the resistance 104 and therefore strengthen the motor field, thus decreasing the speed of rotation of the motor. Opening of contacts 97 and 98 throws in the resistance 104 and weakens the field, thus increasing the speed of rotation of the motor.

The drive assembly including the motor shaft 19 and the gears 20 to 23, inclusive, have already been described. This gear train however may extend through the end plate 105 of the casing and be housed in an auxiliary casing 106 suitably releasably secured thereto by means of such elements as screws 107.

In practice it has sometimes been found advisable to provide some means of rotating the motor shaft and the parts operated thereby manually to a slight degree before energizing the motor electrically for operation. This may be found desirable in the event that there is possibility that the lubrication material has become congealed. For such manual operation there may be provided a releasable spring plunger arrangement constituting a hand knob 108 with cross grooves 109. The plunger is normally spring pressed outwardly by means of a compression spring 110, there being provided a ridge 111 on the barrel 112 of the hand knob for limiting outward movement and a ridge 113 on the barrel for limiting inward movement as the latter ridge abuts the face 114 of the casting. This barrel 112 is preferably provided at its inner end with a conical recess 115 for binding frictional engagement with the motor shaft 19 when the plunger is pressed fully inwardly. This engagement of the barrel with the shaft establishes means by which the motor shaft and its driven parts may be operated manually for the purposes above described. A release of the plunger allows the spring 110 to return the plunger to the position shown in Figure 3, which shows the shaft 19 and the cone clutch 115 of the hand knob disengaged.

An inlet 116 is provided in the motor casing for the introduction of the lead wires 102 and 103 for the resistance circuit for lead wire 117 from the collector brush as well as an inlet for the lead wire 118 from the motor actuating switch 57, 58.

Thus there has been provided a self-contained intervalometer unit for initiating and controlling photographic exposures taken by the camera and for predetermining the interval between each picture of a series, which series continues as long as the motor is energized by outside electrical source and the setting of the hand knob is other than at the "Stop" position. There is also provided a convenient manner for adjusting and setting the device so as to predetermine the interval between exposures and for taking a single exposure at any time after the control knob has been set to "Stop" position. There has also been provided a novel and improved governor for controlling the speed of the motor and also for maintaining the temperature of the self-contained control unit within an operative range so as to insure adequate lubrication and free and easy movement of all moving parts of the unit.

I claim:

1. In an automatic electrically driven time interval control device, electrical contacts and means for making and breaking said contacts at regular predetermined intervals, said means comprising a continuously operating constant speed motor, a shaft driven by said motor, a portion of said shaft being provided with a spiral thread, an oscillatory shaft located adjacent said motor driven shaft, a switch closing device slidably mounted on said oscillatory shaft and adapted to be automatically rocked into and out of engagement with said spirally threaded shaft so as to be moved to effect the closing of said contacts and so as to adapt said switch closing device for movement in the reverse direction to complete a cycle of operation thereof, and means for limiting the extent of said reverse movement.

2. In an automatic electrically driven time interval control device, electrical contacts and means for making and breaking said contacts at regular predetermined intervals, said means comprising a continuously operating constant speed motor, a shaft driven by said motor, a portion of said shaft being provided with a spiral thread, an oscillatory shaft located adjacent said motor driven shaft, a switch closing device slidably mounted on said oscillatory shaft and adapted to be automatically rocked into and out of engagement with said spirally threaded shaft so as to be moved to effect the closing of said contacts and so as to adapt said switch closing device for movement in the reverse direction to complete a cycle of operation thereof, means for limiting the extent of said reverse movement, automatic means effecting alternate engagement and disengagement of said switch closing device with said spirally threaded shaft, said automatic means comprising a projection on said spirally threaded shaft adapted to engage said switch closing device substantially upon completion of said movement in one direction to effect the disengagement of said switch closing device from said spirally threaded shaft, and means for maintaining said switch closing device disengaged from said spirally threaded shaft during said reverse movement and to automatically cause said switch closing device to again engage said spirally threaded shaft upon completion of said reverse movement.

SHERMAN M. FAIRCHILD.